United States Patent [19]

Hunt et al.

[11] Patent Number: 5,087,986
[45] Date of Patent: Feb. 11, 1992

[54] MULTIPORT LIGHT DISTRIBUTOR WITH MECHANICALLY INSERTED AND WITHDRAWN BEAM SPLITTERS

[75] Inventors: Robert P. Hunt, Palo Alto; Alex Lurye, Fremont; George C. Riser, Santa Clara, all of Calif.

[73] Assignee: Picker International, Inc., Highland Hts., Ohio

[21] Appl. No.: 450,685

[22] Filed: Dec. 14, 1989

[51] Int. Cl.$^5$ .............................................. G02B 27/14
[52] U.S. Cl. .................................................. 359/629
[58] Field of Search ........................ 350/171, 173, 169

[56] References Cited

U.S. PATENT DOCUMENTS

| | | | |
|---|---|---|---|
| 3,149,903 | 9/1964 | Merrick | 350/171 |
| 3,622,786 | 11/1971 | Walker et al. | 350/171 |
| 3,684,354 | 8/1972 | Koch | 350/171 |
| 4,908,843 | 3/1990 | Gall et al. | 350/171 |

FOREIGN PATENT DOCUMENTS 1069745 5/1967 France ................. 350/171

Primary Examiner—Jon W. Henry
Attorney, Agent, or Firm—Fay, Sharpe, Beall, Fagan, Minnich & McKee

[57] ABSTRACT

An image, such as a radiographic diagnostic image, is increased in brightness by an image intensifer (B). A multiport image distributor (C) receives the image from an convergent lens (34) and distributes it among a plurality of outlet ports (38, 42, 44, 46, 48). A plurality of cameras (D) or other image receiving processing devices are connected with the outlet ports. The image distributor includes a plurality of modules (50A, 50B, 50C), each of which moves a beam splitter (60) into and out of a beam splitting position. In the beam splitting position, each beam splitter divides the received image between two of the output ports. The four modules in the preferred embodiment enable the image to be distributed among up to five output ports.

19 Claims, 5 Drawing Sheets

FIG. I

MULTIPORT LIGHT DISTRIBUTOR WITH MECHANICALLY INSERTED AND WITHDRAWN BEAM SPLITTERS

BACKGROUND OF THE INVENTION

The present invention relates to the art of transmitting and dividing optical images. The invention finds particular application in conjunction with x-ray image intensifiers and will be described with particular reference thereto. It is to be appreciated, however, that the invention is also applicable to the distribution of other optical images.

Heretofore, image intensifiers have been utilized to convert x-ray images to optical images that are readily recorded by video and film cameras. X-rays from shadowgraphic or other x-ray equipment are focused on an x-ray image amplifier. The image amplifier focuses the x-ray image on a phosphor screen. The optical image from the phosphor screen is focused by an output or collimator lens for optimal viewing. A TV camera, cine camera, photospot camera, roll film camera, cut film camera, or the like is optically coupled to the output lens to receive the generated optical images.

It is relatively inconvenient and time consuming to interconnect and disconnect the selected type of camera with the image intensifier. Accordingly, where two cameras are routinely coupled to the image amplifier, a beam splitter is positioned in front of the output lens such that both cameras can view the image concurrently. The beam splitter is most commonly a partially silvered mirror which allows a portion of the light to pass therethrough to the camera connected with an aligned port and reflects half the light to a camera connected with its other port.

The present invention provides a new and improved light distributor which enables more than two cameras or other types of optical equipment to be interconnected with the same image intensifier or other optical equipment.

SUMMARY OF THE INVENTION

In accordance with one aspect of the present invention, a multiport light distributor is provided. A housing is adapted to receive a lens which introduces an optic image, e.g. from an image intensifier. The housing defines at least three ports through which the image is selectively transmitted. At least first and second beam splitters are mounted in the housing for movement into and out of a beam splitting position. A first of the beam splitters splits light from the lens between the first and second ports and the second beam splitter splits light between the first and third ports. A mechanical beam splitter moving means selectively moves each of the beam splitters into and out of the beam spiitting position.

In accordance with a more limited aspect of the invention, a plurality of identical beam splitter modules are provided. Each module includes a drive member which is pivotally supported by the module at one end and which pivotally supports the beam splitter at an opposite end. A motor means selectively tips the lever arm to move the beam splitter into and out of the beam splitting position. Preferably, each module is fully contained in a pre-shaped wedge such that a selectable plurality of modules can be mounted into the beam splitter.

In accordance with more limited aspects of the invention, a drive linkage is provided between the motor means and the lever arm which enables the motor to be overdriven and actively bias the lever arm toward the beam splitting position continuously. The beam splitter is spring biased relative to the lever arm to assume the beam splitting position. A cam surface is provided for camming the beam splitter against the spring action when the beam splitter is withdrawn from the beam splitting position.

In accordance with another aspect of the present invention, an optical imaging system is provided. An image amplifier amplifies an x-ray image or the like and conveys an output optical image to a multiport light distributor that has at least three output ports. Image receiving means, such as cameras, are connected with the ports. One or more like beam splitting modules are mounted inside the light distributor. Each module selectively splits the light image between pairs of the ports such that the beam splitter selectively directs at least a split portion of the optical image to each port.

In accordance with another aspect of the present invention, a method of distributing optical images among at least three ports is provided. A beam splitter is selectively moved across a lens which introduces the optical image to split the optical image between first and second ports. The first beam splitter is then withdrawn and a second beam splitter is moved across the lens to split the optical image between the first and third ports. The image received at the ports is converted into either an electronic, video, or photographic image representation.

One advantage of the present invention is that it enables a multiplicity of cameras to be interconnected with a single source of optic images.

Another advantage of the present invention is that it enables an optic image to be converted quickly to any one of a plurality of electronic and hard copy formats.

Another advantage is that modules are easily inserted for expansion of beam splitting capacity or for replacement of worn modules.

Still further advantages of the present invention will become apparent to those of ordinary skill in the art upon reading and understanding the following detailed description of the preferred embodiments.

BRIEF DESCRIPTION OF DRAWINGS

The invention may take form in various components and arrangements of components and in various steps and arrangements of steps. The drawings are only for purposes of illustrating a preferred embodiment and are not to be construed as limiting the invention.

DETAILED DESCRIPTION OF THE PREFERRED EMBODIMENTS

Figure 1:
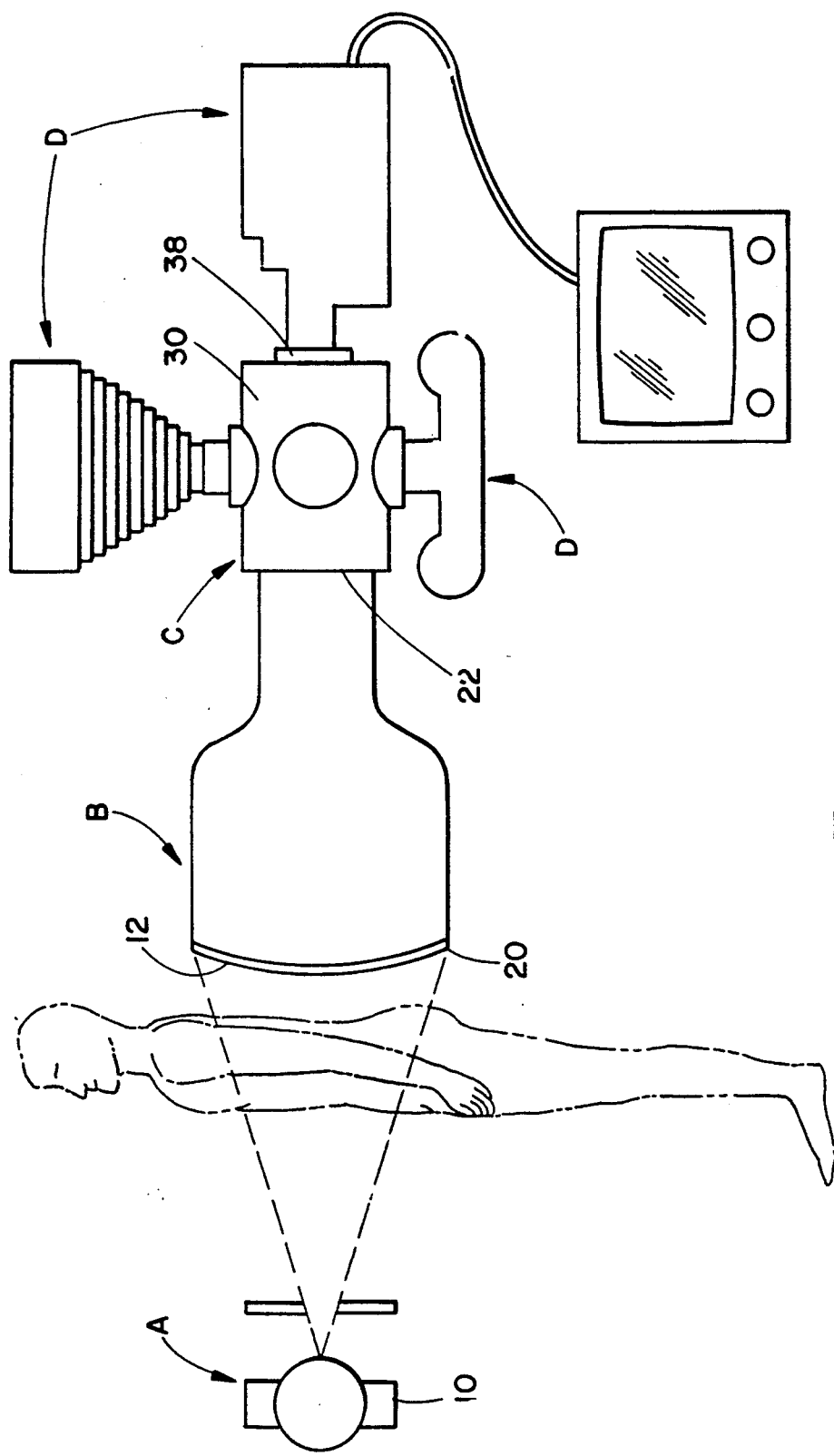
FIG. 1 is a diagrammatic illustration of a system for selectively distributing optic images from a projection x-ray apparatus to any of a plurality of cameras.

A shadowgraphic x-ray apparatus A projects x-rays from an x-ray source 10 through a patient on to a screen 12. The screen 12 includes phosphors which convert the x-ray spectrum electromagnetic radiation into optical spectrum electromagnetic radiation, i.e., light. This phosphor screen thus functions as a source of an optical diagnostic image. Other optical image sources are, of course, anticipated.

An image intensifier or amplifier B receives the optical image from the image source 12 at an input end 20 and provides a brighter image at an output end 22. A multiport light distributor C receives the optical image from the image intensifier or other optical image source and distributes the image among a plurality of image receiving means, such as cameras D.

Figure 2:
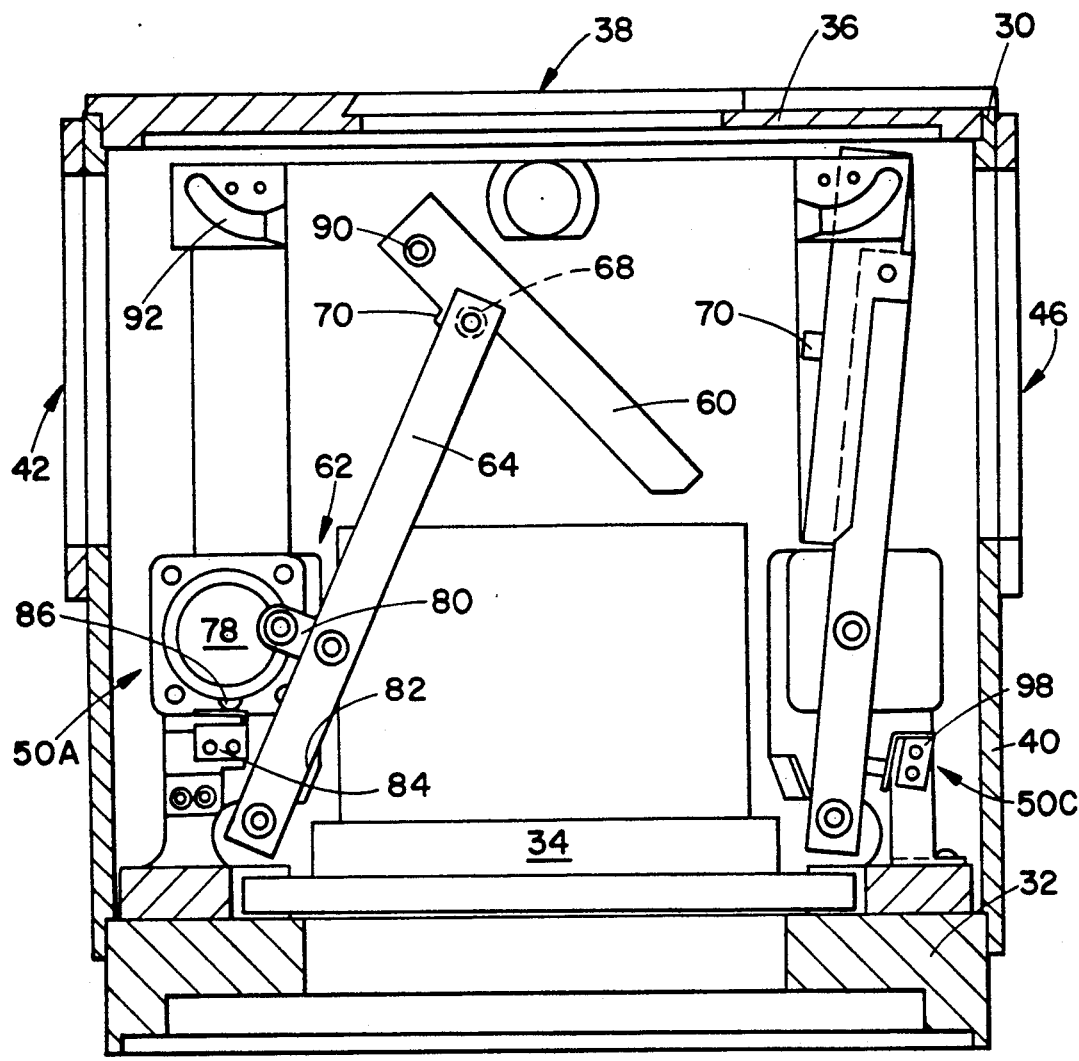
FIG. 2 is a side view in partial section of the light distributor of FIG. 1.
Figure 3:
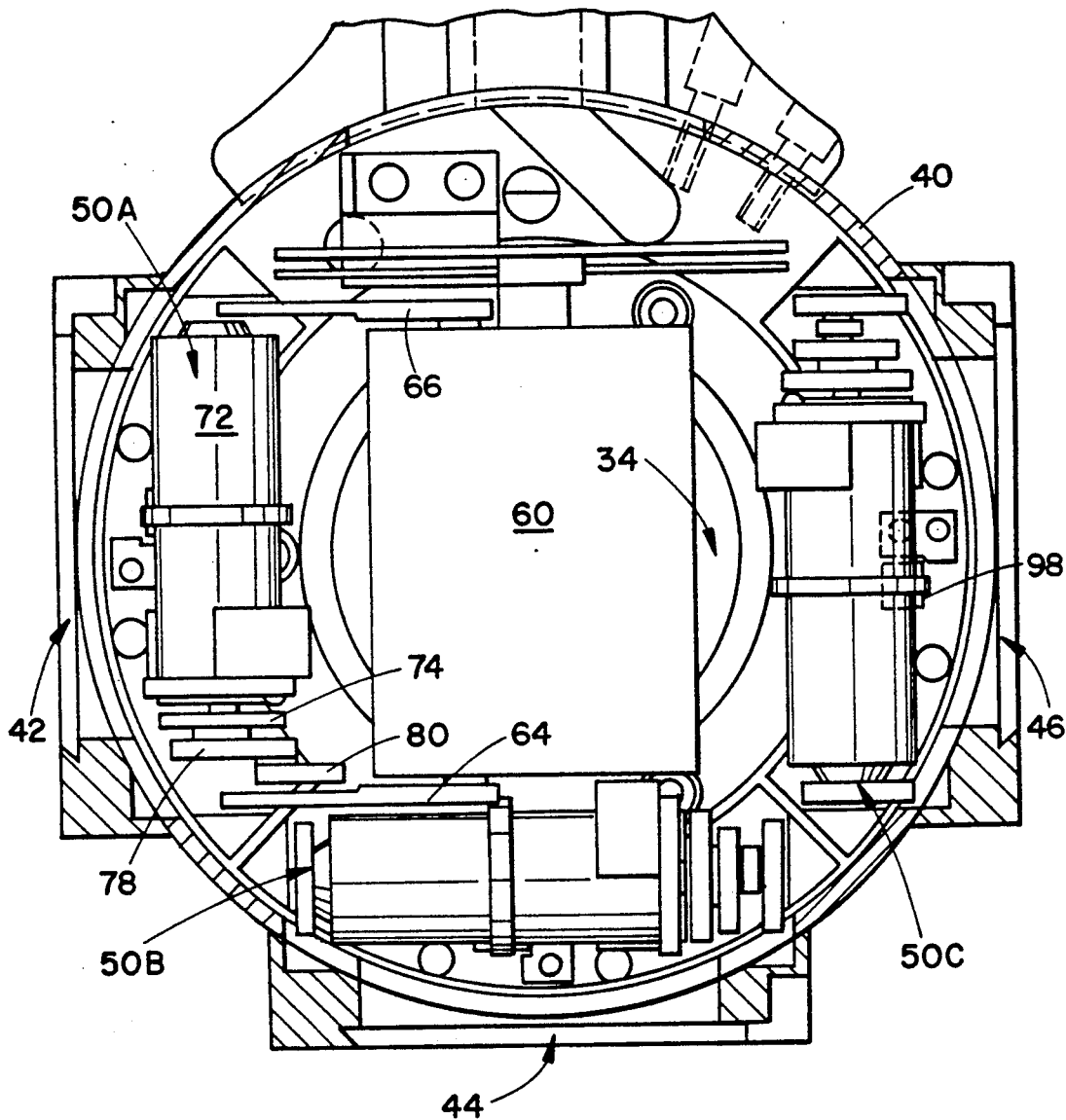
FIG. 3 is a top view in partial section of the light distributor.

With reference to FIGS. 2 and 3, the light distributor C includes a housing 30 including a base 32 that receives and surrounds a convergent lens 34. The convergent lens provides an input of the received optic image to be split. An opposite or top wall 36 is disposed opposite the base and defines a first or in-line outlet port 38 in line with the convergent lens. Preferably, a video camera is connected with the in-line point to monitor the received image continuous.

A peripheral wall 40 defines a plurality of additional ports circumferentially therearound. In the preferred embodiment, four additional ports are defined in the peripheral wall denoted as ports 42, 44, 46, etc. 35 mm cine roll film, cut film cameras, and the like are mounted to the peripheral ports. Beam splitter and drive modules 50A, 50B, 50C, etc. are associated with each of the peripheral wall ports which is active and usable. The beam splitter and drive modules are each confined to a wedge shaped segment of a cylinder to facilitate mounting a plurality of modules. In the preferred embodiment, each module is a 90° generally pie shaped wedge such that four modules are movable in the circular housing. Any ports without an associated splitter and drive module may be permanently sealed.

Each module includes a beam splitter 60 such as a dichroic or partially silvered mirror and a drive mechanism 62 that selectively moves the beam splitter between a first or beam splitting position and a second or retracted position. The drive mechanism includes a pair of links or arms 64, 66 which are pivotally connected to the housing 30. The beam splitter 60 is pivotally connected to a distal end of the arms. A first or beam splitter spring 68 urges the beam splitter to pivot until a stop 70 engages the arms to the beam splitter in the beam splitting position.

Figure 4:
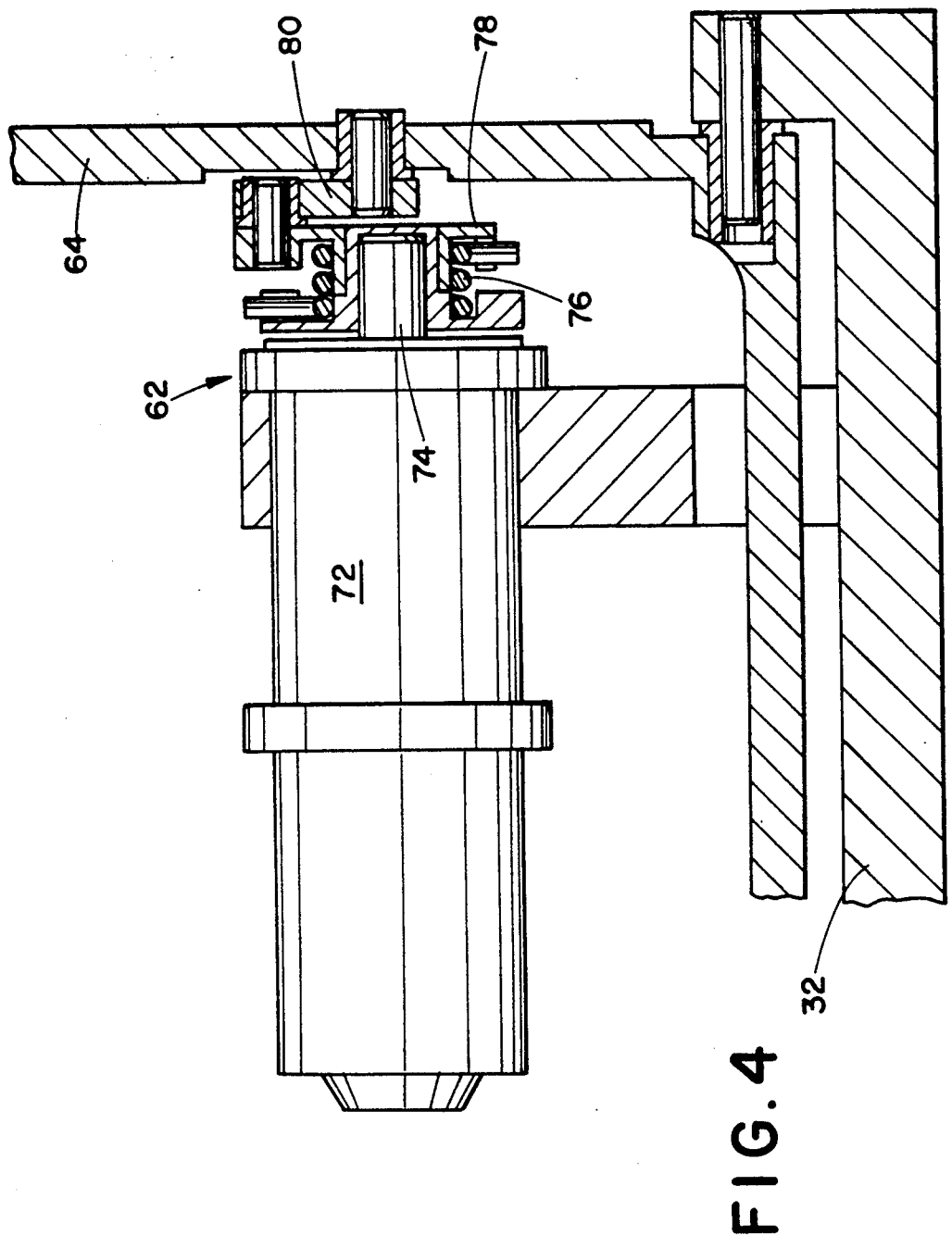
FIG. 4 is a detailed view in partial section of the drive linkage of the light distributor of FIGS. 2 and 3; and, FIG. 5 is a circuit diagram of a control circuit for controlling movement of the modules.

With continuing reference to FIGS. 2 and 3 and further reference to FIG. 4, the drive mechanism further includes a motor 72 that has an output shaft 74. A spring 76 yieldingly connects the output shaft with a rotatably driven member 78 that is connected by a pivoted link 80 to one of the arms 64, 66.

A stop 82 fixes the position of the arms 64, 66 when the beam splitter is in the beam splitting position. The arm stop may interact with any one of the arms 64, 66 the output member 78, and the link 80. In the preferred embodiment, the arm 64 engages the stop surface 82 when the arms are driven to a first or beam splitting position. The output shaft 74 of the motor continues to rotate for a small distance after the stop 82 stops further movement of the arm 64, 66, output member 78, and link 80, thus tensioning the spring. This additional movement is determined by the relative positioning of stop switch 84 and a cam lobe 86 that moves with the output shaft 74. This additional movement puts additional biasing energy into the motor spring 76 to spring bias the drive assembly to the beam splitting position.

When the beam splitter is to be withdrawn from the beam splitting position, the rotation of the motor is reversed and the arms 64 and 66 are drawn toward a vertical position. A guide or follower 90 at an upper end of the beam splitter engages a cam surface 92 which cams the beam splitter against the first spring 68 moving the beam splitter vertical and sufficiently away from the convergent lens 34 that it does not interfere with beam splitters of other modules.

Figure 5:
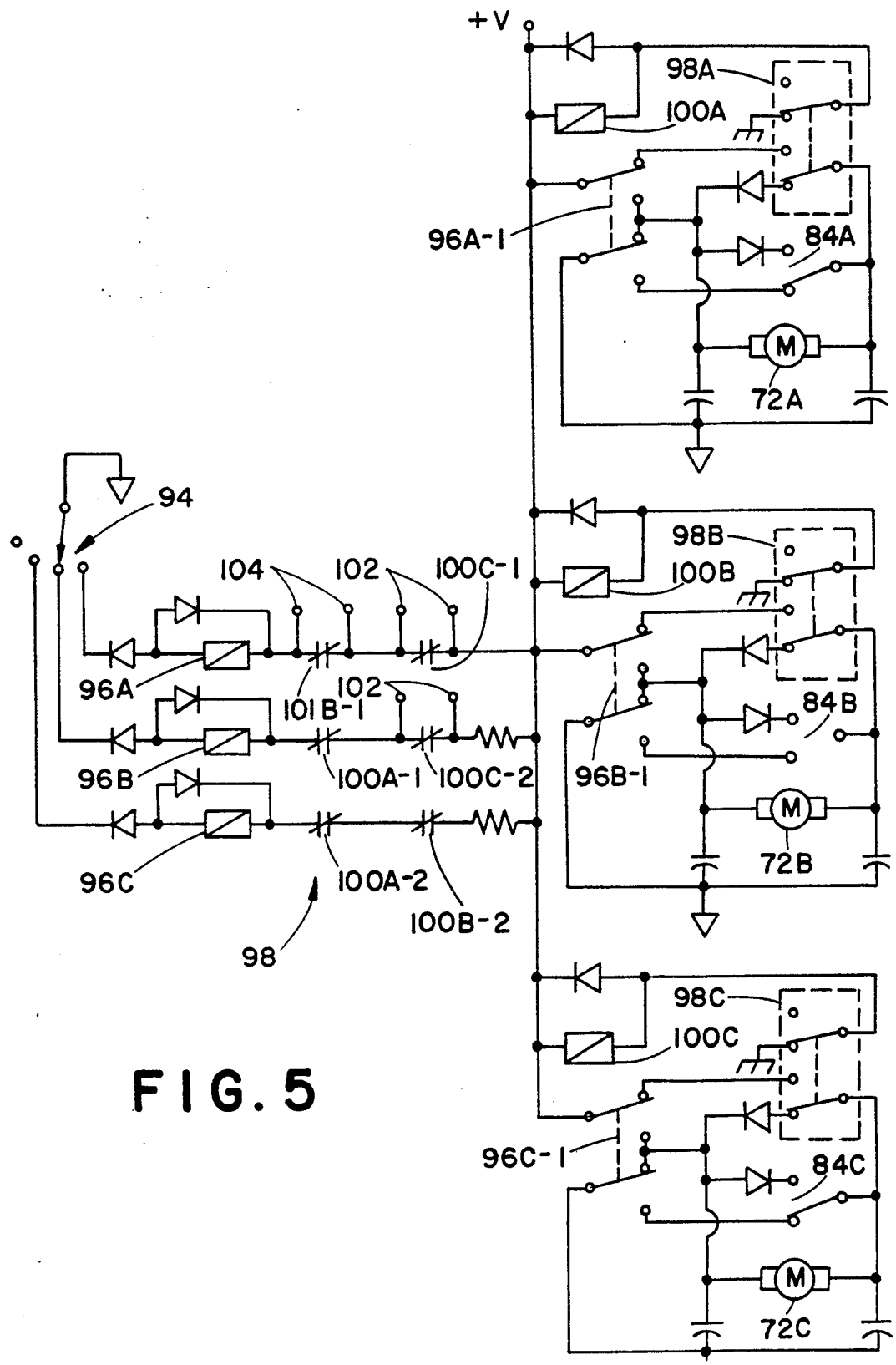

With reference to FIG. 5, the operator positions a module selector switch 94 to control which of modules 50A, 50B, or 50C are to split the beam. The position of the module selector switch causes one of control relays 96A, 96B, 96C to close associated contacts 96A-1, 96B-1, 96C-1. Power is supplied through the associated contacts to associate drive motor 72A, 72B, 72C, until the associated stop switch 84A, 84B, 84C is engaged by the cam lobe.

An interlocking microswitch means 98 is provided such that only one of the drive modules can move its beam splitter into beam splitting position in front of the convergent lens. On an electrical level, the interlock means includes interlock limit switches 98A, 98B, 98C connected with each of the drive motors or other moving portions of the drive module. Each limit switch enables an associated relay 100A, 100B, 100C only when its associated beam splitter is fully withdrawn. The interlock relays control contacts 100A-1, 100A-2, 100B-1, 100B-2, 100C-1, 100C-2 that are connected in series with the other drive motor relays 96A, 96B, 96C. IN this manner, each of the drive motors can only receive actuating current when the beam splitters of all of the other drive modules are fully retracted. The same or analogous limit switches are used to indicate that a retracting drive module has become fully retracted and terminate the supply power to the associated motor during retraction. Jumper contacts 102 are shorted if only two modules are present and second jumper contacts 104 are shorted if there is only one module.

On a mechanical level, the arms of a drive module in the beam splitting position block the movement of the arms of the adjoining drive modules. Optionally, an additional mechanical interlock may be provided for oppositely mounted modules.

The use of individual modules enables the light distributor to be as simple as a two port beam splitter or expanded to a five port distributor.

The invention has been described with reference to the preferred embodiment. Obviously, modifications and alterations will occur to others upon reading and understanding the preceding detailed description. It is intended that the invention be construed as including all such alterations and modifications insofar as they come within the scope of the appended claims or the equivalents thereof.

Having thus described the preferred embodiment, the invention is now claimed to be:

1. A multiport light distributor comprising:
   a housing that includes a base portion having an input port for receiving light to be distributed, the housing further defining at least first, second, and third ports through which light is selectively discharged;
   at least first and second beam splitters, in a beam splitting position the first beam splitter selectively splits light from the input port between the first and second ports and in its beam splitting position the second beam splitter selectively splits light from the input port between the first and third ports;

at least first and second drive mechanisms for selectively moving the first and second beam splitters into and out of their respective beam splitting positions, the first beam splitter and first drive mechanism are mounted in a first module and the second beam splitter and second drive mechanism is mounted in a second module, the first and second modules being substantially identical and configured to occupy a pie-shaped angular section of the housing to facilitate mounting of additional like modules within the housing.

2. The multiport light distributor as set forth in claim 1 further including an interlock means for preventing more than one beam splitter to be in its beam splitting position at a time.

3. The multiport light distributor comprising:

a housing that includes a base portion having an input port for receiving light to be distributed, the housing further defining at least first, second, third, and fourth ports through which light is selectively discharged;

a first drive mechanism for selectively moving a first beam splitter into and out of a beam splitting position in which light from the inlet port is selectively split between the first and second parts;

a second drive mechanism for selectively moving a second beam splitter into and out of a beam splitting position in which light from the inlet port is selectively split between the first and third parts;

a third drive mechanism for selectively moving a third beam splitter into and out of a beam splitting position in which light from the inlet port is selectively split between the first and fourth ports.

4. The multiport light distributor as set forth in claim 3 wherein the housing further includes a fifth port, a fourth drive mechanism selectively moves a fourth beam splitter into and out of a beam splitting position in which light from the inlet port is selectively split between the first and fifth ports.

5. The multiport light distributor as set forth in claim 1 wherein each drive mechanism includes a pair of arms connected to the associated beam splitter adjacent one end and pivotally connected to the housing adjacent another end and a motor means for selectively moving the arm between a first position in which the beam splitter is in its beam splitting position and a second position in which the beam splitter is retracted.

6. A multiport light distributor comprising:

a housing that includes a base portion having an input port for receiving light to be distributed, the housing further defining at least first, second, and third ports through which light is selectively discharged;

at least first and second beam splitters, in a beam splitting position the first beam splitter selectively splits light from the input port between the first and second ports and in its beam splitting position the second beam splitter selectively splits light from the input port between the first and third ports, each beam splitter is pivotally connected to one end of a pair of arms that are pivotally connected to the housing a spring biases the beam splitters relative to the arms toward its beam splitting position, a guide is mounted to the beam splitter, and a cam surface is operatively connected with the housing for engaging the guide such that the beam splitter is rotated relative to the arms against the spring bias as the beam splitter is moved towards its withdrawn position;

at least first and second drive mechanisms for selectively moving the first and second beam splitters into and out of their respective beam splitting positions, each drive mechanism including a means for selectively moving the arms between a first position in which the beam splitter is in its beam splitting position and a second position in which the beam splitter is retracted.

7. The multiport light distributor as set forth in claim 6 further including a spring interconnected between the motor means and one of the arms such that continued movement of the motor means after the arms reach the first position tensions the spring such that the spring provides a positive biasing of the arm toward the first position.

8. The multiport light distributor as set forth in claim 7 further including a limit switch for stopping movement of the motor means after the arm has reached the first position and the spring has been tensioned.

9. A multiport light distributor comprising:

a housing that includes a base portion having an input port for receiving light to be distributed, the housing further defining at least first, second, and third ports through which light is selectively discharged;

at least first and second beam splitters, in its beam splitting position the first beam splitter selectively splits light from the input port between the first and second ports and in its beam splitting position the second beam splitter selectively splits light from the input port between the first and third ports;

at least first and second drive mechanisms for selectively moving the first and second beam splitters into and out of their respective beam splitting positions, each of the first and second drive mechanism including:

a pair of pivotally mounted arms to which the beam splitter is pivotally mounted adjacent one end;

a beam splitter stop for limiting rotation of the beam splitter in one direction to the beam splitting position;

a beam splitter spring means for spring biasing the beam splitter towards the beam splitting position;

a motor for selectively pivoting the arms between the beam splitting position and a retracted position;

the beam splitter, arms, stop, spring means, and motor being configured and arranged int he retracted position to fit completely within a quadrant of a light distributor housing such that up to four like modules are selectively mountable within the housing.

10. The multiport light distributor as set forth in claim 9 further including a guide mounted to the beam splitter and a cam surface for engaging the guide such that the beam splitter is rotated relative to the arms against the spring bias as the arms move towards the second position.

11. The multiport light distributor as set forth in claim 9 further including a spring interconnected between the motor and one of the arms such that continued movement of the motor means after the arm reaches the first position tensions the spring such that the spring positively biases the arm toward the first position.

12. The multiport light distributor as set forth in claim 11 further including a limit switch for stopping movement of the motor after the arms have reached the first position and the spring has been tensioned.

13. The multiport light distributor as set forth in claim 3, further including first, second, and third cameras connected with the first, second, and third ports for receiving light discharged therethrough.

14. The multiport light distributor as set forth in claim 13 wherein one of the cameras is an electronic camera means which converts the received optical image into an electronic image representation.

15. The multiport light distributor as set forth in claim 13 wherein one of the cameras is a photographic camera for forming a photograph of the received image.

16. The multiport light distributor as set forth in claim 13, further including:
   a radiographic apparatus for generating a diagnostic image of a selected portion of a patient;
   an image intensifier operatively connected with the radiographic apparatus for providing an optical image of increased intensity, the image intensifier being operatively connected with the housing input port for supplying the optical image of increased intensity thereto.

17. A method of distributing optical images among at least four image receiving devices, the method comprising:
   selectively moving a first beam splitter into a position in which a received image is split between a first and a second of the devices;
   retracting the first beam splitter to a retracted position and moving a second beam splitter into a beam splitting position in which the received image is a split between the first device and a third device;
   selectively retracting the second beam splitter to a retracted position and a moving a third beam splitter into a beam splitting position in which it splits the received image between a fourth device and one of the first, second and third devices.

18. The method as set forth in claim 17 further including blocking movement of the retracted beam splitters when one of the beam splitters is in its beam splitting position.

19. The multiport light distributor as set forth in claim 1 wherein each of the first and second drive mechanisms include:
   a pair of pivotally mounted arms to which the beam splitter is pivotally mounted adjacent one end;
   a beam splitter stop for limiting rotation of the beam splitter in one direction to the beam splitting position;
   a beam splitter spring means for spring biasing the beam splitter towards the beam splitting position;
   a motor for selectively pivoting the arms between a first position in which the beam splitter is in the beam splitting position and a second position in which the beam splitter is in the retracted position.

* * * * *